United States Patent [19]

Gambell et al.

[11] Patent Number: 4,457,904
[45] Date of Patent: Jul. 3, 1984

[54] HYDROGEN CYANIDE PROCESS
[75] Inventors: James W. Gambell, St. Louis, Mo.; Steven R. Auvie, Macungie, Pa.
[73] Assignee: Monsanto Company, St. Louis, Mo.
[21] Appl. No.: 406,681
[22] Filed: Aug. 9, 1982
[51] Int. Cl.³ .............................................. C01C 3/02
[52] U.S. Cl. ................................................... 423/376
[58] Field of Search ........................................ 423/376
[56] References Cited
U.S. PATENT DOCUMENTS

| 1,920,795 | 8/1933 | Jaeger | 423/376 |
| 2,878,169 | 3/1959 | Christmann et al. | 423/376 |
| 4,164,552 | 8/1979 | Weigert | 423/376 |

FOREIGN PATENT DOCUMENTS 824404 12/1959 United Kingdom ................ 423/376

OTHER PUBLICATIONS

"Catalytic Formation of Hydrocyanic Acid, III, Formation of Hydrocyanic Acid from Carbon Monoxide and Ammonia", by Bredig et al., Zeitschrift Fur Elektrochemie, 36, 1003–7, (1930).

Primary Examiner—John Doll
Assistant Examiner—Wayne A. Langel
Attorney, Agent, or Firm—Joseph D. Kennedy; James W. Williams, Jr.

[57] ABSTRACT

Hydrogen cyanide is produced from ammonia and carbon monoxide, or gases containing these compounds, while substantially avoiding the water shift reaction, by passing these compounds in contact with catalyst masses (for example, alumina-silica molecular sieves) having a high protonic acid content. Protonic acid content can be measured by ammonium acetate titration.

14 Claims, 1 Drawing Figure

HYDROGEN CYANIDE PROCESS

BACKGROUND OF THE INVENTION

Various processes have been described in the literature for producing hydrogen cyanide (hereafter HCN) from ammonia (hereafter $NH_3$) and carbon monoxide (hereafter CO) by passing these compounds in contact with various catalyst materials, including alumina, mixtures of silica gels and alumina, and mixtures of alumina, silica and various other metal oxides. Thus, processes of producing HCN from $NH_3$ and CO using such types of materials are described, respectively, in U.S. Pat. No. 1,920,795, granted to Alphonse O. Jaeger, Aug. 1, 1933 (hereafter Jaeger patent) and in an article in *Zeitschrift fur Elektrochemie* 36 1003-7 (1930) by Bredig, E. Elod and Rudolf Muller entitled "Catalytic Formation of Hydrocyanic Acid, III. Formation of Hydrocyanic Acid from Carbon Monoxide and Ammonia" (hereafter Bredig et al article).

Referring now more specifically to the above-identified prior literature disclosures, the Jaeger patent describes a process in which CO and $NH_3$ at temperatures of 400° to 700° C. and atmospheric or superatmospheric pressure are passed into contact with multi-component zeolites composed of silica, alumina and various metal acids such as vanadyl, chromium, thorium, tungstic acid and molybdic acid and the like. The latter are presumably converted to oxides on calcination. The Jaeger patent teaches that in the formation of such multi-component zeolites by such methods the final reaction product must be alkaline to litmus; and for products of high base exchanging power the zeolites should be neutral or alkaline to phenolphthalein. On the other hand, the Bredig et al article discloses a process in which CO and $NH_3$ at a temperature of 700° C. are passed into contact with a catalyst which may be a silica gel, a silica-thorium-aluminum oxide gel, a silica alumina gel or an alumina oxide on clay shards. The article states "it was first established that silica gel alone and silica gels mixed with thoria and alumina are considerably inferior in their effectiveness to the other catalysts, including also aluminum oxide on clay shards". The other catalysts referred to in this article appear to be mixtures of alumina and thorium oxide, mixtures of alumina and cerium oxide, or cerium oxide per se.

A study of the Jaeger patent and Bredig et al article indicates that neither experimenter employed an alumina-silica co-catalyst which was highly selective for converting CO and $NH_3$ to HCN while substantially avoiding the conversion of CO to $CO_2$ via the water gas shift reaction. This is apparently due to the fact that these experimenters did not recognize what properties were necessary to avoid the conversion of CO to $CO_2$ via the water shift reaction nor did they disclose processes of preparing catalysts having such properties.

SUMMARY OF THE INVENTION

The present invention relates to a process in which $NH_3$ and CO are converted to HCN at elevated temperatures and pressures using catalysts, preferably of the alumina-silica co-gel type (or alternatively certain types of molecular sieves), having high protonic acid values thereby achieving selectivities of CO to HCN conversion on the order of 85% or more while avoiding significant $NH_3$ decomposition. The invention also provides, as a feature to the primary process described above, a process in which the HCN obtained is recovered facilely and economically from the other gases, such as unconverted CO and $NH_3$, and the unreacted CO and $NH_3$ are recycled for further reaction and conversion to HCN.

DESCRIPTION OF THE PREFERRED EMBODIMENTS

Figure 1:
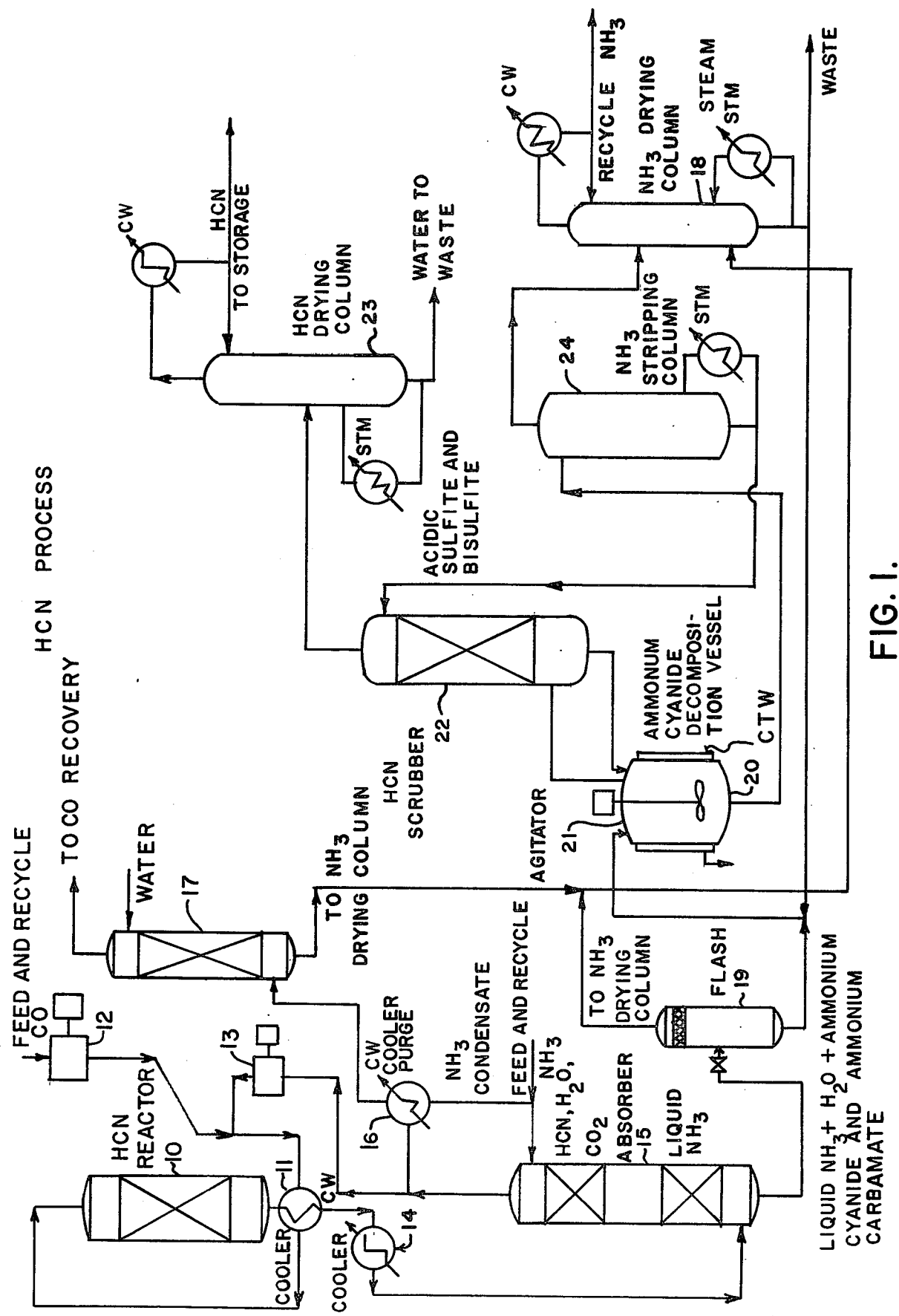

In accordance with the present invention CO and $NH_3$, at elevated temperatures, for example, of the order of 550° to 750° C. and elevated pressures, for example, of the order of 200-600 pounds per square inch gauge, are brought into contact with solid catalysts having a protonic acid-strength index (or K) of at least $0.5 \times 10^{-4}$, or, stated in another way, a protonic acid content, expressed as $meq/m^2 \times 10^4$ (milliequivalents per square meter $\times 10^4$), of at least 15, to form HCN. The protonic acid values as stated above are obtained by ammonium acetate titration as will be explained in detail hereinafter. The mol ratio of CO to $NH_3$ used may be varied considerably, for example, from about 1:10 to about 5:1, but the first stated ratio is somewhat uneconomical and also results in greater $NH_3$ decomposition whereas the second stated ratio results in greater loss of CO to products other than HCN. A preferred mol ratio of CO to $NH_3$ is between about 1:4 to about 1:6, and such ratios promote the selectivity of CO to HCN.

By operating within the above parameters it is possible to obtain selectivity of conversion of CO to HCN on the order of 85% or higher, for example, as high as 96%, with substantially no conversion of CO to carbon dioxide via the water gas shift reaction which reaction is customary in most processes involving the catalytic conversion of $NH_3$ and CO to HCN. Moreover, it is possible to achieve the aforementioned results without decomposition of significant quantities of $NH_3$. The conversion of CO to HCN per pass of the catalyst is relatively low usually on the order of about 7 to 13% depending on reaction conditions, but the conversion is very fast and this permits the use of high space velocities usually of the order of GHSV'S of about 5000–9000 hr $^{-1}$ at STP (standard temperature and pressure). GHSV, as used herein, means the Gas Hourly Space Velocity and is the volume of gas at STP (standard temperature and pressure) per hour divided by the volume of the catalyst bed, where the volume of gas and bed is expressed in the same units. Also, the HCN formed can be facilely and economically separated from the unreacted $NH_3$ and CO by a process hereinafter described, and these gases can then be recycled past the catalyst for further production of HCN. It should be noted in this regard that only a small quantity of by-product gases or materials are obtained in the operation of the present process so it is unnecessary to remove or separate such by-products from the unreacted $NH_3$ and CO prior to further contacting the latter gases with the catalyst to produce additional HCN.

In carrying out the present process initially, it is possible to use $NH_3$ from any source, but it is preferred to use $NH_3$ which is relatively free of other gases and more particularly it is preferred to use an $NH_3$ source which contains at least 90 volume %, more desirably at least 95 volume % of $NH_3$. The CO employed likewise can be from any source, for example, from the combustion of coal or hydrocarbons, but it is preferred to employ a CO source which is relatively free of other gases and more particularly it is preferred to use a CO source which contains at least 90 volume %, more desirably at least 95 volume % of CO.

Mixtures of unreacted $NH_3$ and CO obtained after the first or subsequent passes past the catalyst, may contain somewhat higher percentages of other gases, for example, up to 10 volume %, without substantial adverse effect in using such for further reaction to HCN.

As is indicated above, the present processes are carried out at elevated temperatures. Normally, if the temperature of the $NH_3$ and CO are significantly below 500° C., say 450° C. at the time of contact with the catalyst, the percentage of CO converted to HCN is below that at which the process can be carried out economically. On the other hand, temperatures up to 900° C. can be employed with High Gas Space Velocities to obtain CO to HCN selectivities of the order of 80% or more, but at temperatures from 700° up to 900° C. larger amounts of $NH_3$ are decomposed. In view of these considerations, it is preferred to carry out the conversion of CO and $NH_3$ to HCN at the temperatures first mentioned above, namely, 550° C. to about 750° C.

The gas pressures employed in the present processes can be varied considerably and do not appear to be critical. However, usually optimum results will be obtained by operating within a gas pressure range of about 500–650 pounds per square inch.

The catalysts used in the present processes have a high acidity as noted above, in contrast to the alumina or silica-alumina mixtures employed in prior art processes for the reaction of CO and $NH_3$. This acidity is expressed in terms of an acid content of at least 15 meq/$m^2 \times 10^4$, where meq stands for milliequivalents and m is meter. Catalysts having an acidity substantially below this value generally have a lower CO to HCN selectivity than is desirable from an economical viewpoint and therefore are not as useful in the present processes. The acid content of the useful catalysts is determined by the ammonium acetate titration method described in an article by V. C. Holm, G. C. Bailey and Alfred Clark in the *Journal of Physical Chemistry*, Volume 63, No. 2, pages 129 through 133, Feb. 18, 1959, particularly page 130, (hereinafter referred to as the Holm et al article), which article is hereby incorporated by reference and made a part of this description, and the claims, in so far as it is applicable thereto. Briefly, pursuant to the Holm et al article, the protonic acid content of a solid catalyst is determined by titrating a 0.1 gram powdered catalyst sample with 0.1 N ammonium acetate solution from which titration it is possible to determine the milliequivalents of acid per gram of catalyst. This value is then divided by the surface area of the catalyst in square meters per gram to give an acid content expressed in meq/$m^2 \times 10^4$.

Catalysts useful in the present processes can be selected from a large variety of materials which are solids at normal room temperatures and pressures as well as at the temperatures and pressures employed in the processes, provided such catalysts have the high acidity hereinbefore specified. One example of a suitable catalyst is alumina which has been treated to give it the proper acidity. In this regard, it might be noted that alumina or aluminum hydroxide per se is much too alkaline to be useful in the present processes. However, alumina which has been treated with 2 weight percent of ammonium bifluoride or 15 weight percent of boron oxide, for example, has an acid content above 15 meq/$m^2 \times 10^4$ and provides a catalyst, which when employed within the optimum parameters of the present processes, gives a CO to HCN selectivity above 90%.

Another suitable catalyst is Kieselguhr (a diatom siliceous material normally containing about 85 weight percent or more silica) containing about 54 weight percent of phosphoric acid. Kieselguhr which has been rendered acidic by other treatment to the acid contents herein specified can also be used as a catalyst. It should be noted that Kieselguhr or silica or silica gel per se usually are not sufficiently acid to have the high acid contents herein required and, if not, are not satisfactory catalysts. On the other hand, Kieselguhr usually contains the oxides of transitional metals such as vanadium, titanium and the like which have the property of causing some $NH_3$ decomposition and therefore is not as desirable a catalyst as other catalysts disclosed herein.

Another group of catalysts which can be used in the present processes are naturally occurring clays which have been treated to give them the requisite acid content. Of the naturally occurring clays those which are crystalline and composed primarily of aluminum silicates and magnesium silicates, those composed primarily of aluminum silicates are preferred. Examples of such clays are kaolins, serpentines, micas (or illite), montmorillonites, glauconites, attapulgites and the like. The presence of transitional valence metals such as iron, chromium, vanadium and the like in a naturally occurring clay can cause an increase in $NH_3$ decomposition and $CO_2$ formation in the present process, therefore it is preferred to use clays which are substantially free of such metals, for example, contain less than 0.2 weight percent of such metals. Amorphous, naturally occurring clays such as allophanes, which are aluminum silicates, can also be used, if obtained at or treated to the proper acid content.

Another form of catalytic material which can be used are the high alumina containing clays which are either naturally occurring or associated with the clays referred to above. These clays such as diaspore and bohemite, are primarily composed of alumina in amorphous form and are usually free of silicates, although they may be formed in combination with siliceous clay materials. In most instances diaspore and bohemite will contain small amounts of metal oxides other than alumina. Generally, the naturally occurring clays are not sufficiently acid to be used in the present processes to give high selectivity of CO to HCN, but they can be brought to the proper acidity in the manner described above or by other means known to those skilled in the art.

Another class of catalysts which can be used in the present processes are the synthetic magnesium oxide-silica cogels having the acid contents hereinbefore specified. Such cogels are usually prepared from a magnesium compound or salt such as magnesium chloride coprecipitated with silicic acid from an aqueous solution of sodium silicate. The cogel is usually caused to become crystalline by retaining it in water at elevated temperatures for extended periods of time. The crystalline magnesium oxide-silica contact catalysts can be made to have a requisite high acid content by ion exchange in which the alkali metal cations in the catalyst are exchanged with hydrogen ions by treatment with an acid or by replacing the alkali metal cations in the catalyst with ammonium cations and then decomposing the catalyst ammonium form by heat thus driving off $NH_3$ and leaving hydrogen ions in place of the ammonium ions. If the magnesium oxide to silica ratio is insufficient to provide the requisite acid content in the catalyst, the catalyst can be treated with ammonium bifluoride or $B_2O_3$ to provide the requisite acid content.

A preferred class of catalyst for use in the present processes are the synthetic alumino silicates composed of alumina and silica. Actually, as in the case of the magnesia-silica cogels referred to above, the cogels of alumina and silica usually are of indeterminate structure because they are polymeric in nature consisting of chains of molecules possibly of differing lengths and sizes. However, they are surprisingly uniform in regard to pore sizes and properties within a defined ratio of alumina to silica. They are also formed and crystallized much in the same manner as the magnesium-silica cogels referred to above.

The useful silica aluminum cogels or alumino silicates having the requisite high acid content are made with an alumina content of about 30 to about 5 weight percent alumina and about 70 to about 95 weight percent of silica. If the alumina content is higher or lower than those values, the alumina silicates will not have the requisite acid content unless it is treated with an acidic material such as ammonium bifluoride, $B_2O_3$, $H_3PO_4$ or the like. However, such treatment may not continue to provide the requisite acidity over a period of time so an alumina silicate having the desired acidity as produced is preferably used in the present process. Usually alumina silicates having an alumina content of about 25 to about 5 weight percent and a silica content of about 75 to about 95 weight percent and an acid content of at least 16 $meq/m^2 \times 10^4$ will give the maximum CO to HCN selectivity and these provide preferred catalysts for use in the processes of the present invention.

With regard to the aforementioned alumino silicates it should be noted that physical mixtures of alumina and silica, even though present in the weight ratios referred to above, are ineffective in promoting the conversion of CO and $NH_3$ to HCN, particularly in regard to not precluding the conversion of CO to $CO_2$ via the water gas shift reaction.

Another family of alumino silicates, known as synthetic zeolites, provide another group of preferred catalysts provided they have the requisite acidity. This group of alumina silicates are characterized by being crystalline solids with exceptionally uniform pores or cavities. Usually, such alumino silicate zeolites, when properly washed to remove basic cations, will have the requisite acidity and thus will function to catalyze the conversion of CO and $NH_3$ to HCN without excessive loss of CO to the water gas shift reaction.

For example, a commercially available molecular sieve, ZSM-5, manufactured by Mobil Chemical Co., having the requisite acidity or which can be treated to provide such acidity can be used successfully in the present process. Another commercially available material which can be used in the present process, provided it has the requisite acidity, is the Y-form of Faujasite, available from the Linde Division of Union Carbide Corp. Other commercially available molecular sieves may be used if they have the requisite acidity. For information regarding manufacture of molecular sieves see Encyclopedia of Chemical Technology, 3rd Edition, (1981) Volume 15, pages 650 and 654–656, Kirk-Othmer, published by John Wiley and Sons, New York, N.Y.

Naturally occurring zeolites also can be used. Transition metal impurities may render a particular naturally occurring zeolite less useful for reasons indicated above. In any event, such zeolites must have the requisite acidity or treatment to provide the necessary acidity that will be required.

The following specific examples are intended to illustrate the invention but not to limit the scope thereof, parts and percentages being by weight unless otherwise specified.

EXAMPLE 1

A mixture of substantially pure $NH_3$ and substantially pure CO in a mol. ratio of 5:1 ($NH_3$ to CO) was passed over the hydrogen form of a commercial ZSM-5 molecular sieve (alumina silica) having an acid content of 18 $meq/m^2 \times 10^4$ and an $SiO_2$:$Al_2O_3$ mol ratio of about 30:1, at a temperature of 600° C. and 550 psig (gauge) and a GHSV (as previously defined in the description herein) of about 7500 $hr^{-1}$ at STP. It was found that the CO was converted to HCN with a selectivity of about 96% and a conversion rate of about 12%. No significant amount of $CO_2$ was detected. The $NH_3$ to HCN selectivity was about 90% with no significant decomposition of $NH_3$. These results indicated that substantially none of the CO was being converted to $CO_2$ via the water shift reaction.

The catalyst was quite stable under the above conditions and could be used over a relatively long period of time without any repurification or other treatment. ZSM-5 molecular sieves as employed herein and the preparation thereof are described in U.S. Pat. No. 3,702,886 assigned to Mobil Oil Corporation. The structure of this class of sieves is discussed in Nature, Vol. 272, Page 437, March 30, 1978.

EXAMPLE 2

The process of Example 1 was repeated except that the catalyst used was the Y form of Faujasite, a molecular sieve product produced and sold by the Linde Division of Union Carbide Corp, of New York, N.Y. This catalyst had an acid content of about 18 $meq/m^2 \times 10^4$ and an acid strength essentially equivalent to the catalyst used in Example 1. It was found that the CO was converted to HCN with a selectivity of about 95% and a conversion rate of about 11% without any significant formation of $CO_2$. The $NH_3$ to HCN selectivity was about 89% and no significant decomposition of $NH_3$ was noted.

The catalyst did not appear to be materially affected by the reaction process and could be reused without repurification or other treatment.

EXAMPLE 3

Forty and six tenths (40.6) parts of Catapal alumina, (obtained from Continental Oil Company) which had been oven dried at 100° C., was stirred into a water solution of 1.22 parts of ammonium bifluoride. The alumina was then filtered from the solution, dried for about 16 hours at 98° C. in a forced air oven and finally calcined for 4 hours at 500° C. in a muffle furnace. The resulting material had an acid content of 16 $meq/m^2 \times 10^4$.

A mixture of substantially pure $NH_3$ and substantially pure CO in a mol ratio of 6:1 ($NH_3$ to CO) was passed over the aforedescribed ammonium bifluoride treated alumina at a temperature of 659° C. and 600 psig (gauge) and a GHSV of about 8000 hour at STP. It was found that the CO was converted to HCN with a selectivity of about 90% and conversion rate of about 11%. Substantially no $CO_2$ was formed in the course of the reaction.

Essentially equivalent results can be obtained in the foregoing process by using clays containing alumininum silicates, namely, clays such as kaolins, serpentines, micas and montmorillonites which have been treated with ammonium bifluoride as above described and which have an acid content of at least 15 meq/m$^2 \times 10^4$.

EXAMPLE 4

Twenty six and five tenths grams of boric acid were slurried in 300 ml of deionized water. To this were added 114 grams of Catapal alumina (see Example 3) and 100 ml of glacial acetic acid. The resulting mixture was stirred and placed on a steam bath. After 2 hours on the steam bath, with occasional stirring, the mixture was removed from the steam bath and 419.4 grams of ammonium hydroxide was added and the whole was allowed to sit for about 16 hours after which the supernatant liquid, which was practically clear, was siphoned off. The resultant white cake was reslurried in a solution of 100 ml of NH$_4$OH in 1 liter of deionized water. The last two steps were repeated after which the supernatant liquid was siphoned off and the whole cake was heated on a steam bath while passing a stream of nitrogen gently over the cake. After all free liquid had evaporated the still moist cake was dried in a forced air drying oven for 16 hours at 100° C. and then heated in a muffle furnace for 1 hour at 200° C., for 1 hour at 300° C., for 3 hours at 500° C. and 2 hours at 650° C. The resulting boric acid treated alumina had an acid content of 17 meq/m$^2 \times 10^4$.

A mixture of NH$_3$ and CO in a mol ratio of 5.5:1 (NH$_3$ to CO) was passed over the aforedescribed boric acid treated alumina at a temperature of 700° C. and 500 psig (gauge) and a GHSV of 8000 hour$^{-1}$ at STP. It was found that the CO was converted to HCN with a selectivity of about 90% and a conversion rate of about 12%. No significant quantities of CO$_2$ were formed in the operation of the process and less than 5% of the NH$_3$ was lost due to decomposition.

Essentially equivalent results can be obtained in the foregoing process by using kieselguhr or any of the primarily aluminum silicate containing clays such as kaolins, serpentines, micas and montmorillonite which have been treated with boric acid as above described and which have an acid content of at least 15 meq/m$^2 \times 10^4$.

EXAMPLE 5

An aluminum silicate (or alumina-silica cogel) was formed by the following procedure:

There was added with agitation, to 10 liters of distilled H$_2$O in a twenty liter container, 1950 cc of a solution of 640 grams of H$_2$SO$_4$ in 1600 cc of distilled H$_2$O (about 6.5 N H$_2$SO$_4$) and a solution of 325 grams of sodium silicate in 2000 cc of H$_2$O (sufficient to provide about 91 grams of SiO$_2$), with the two solutions being added so as to provide a pH in the mixture of about 6-7 and a final pH of about 5.8. A filtered solution of 75 grams of NaAlO$_2$ in a liter of H$_2$O was then added to the above mixture during which time the pH of the resultant mixture was raised to 9.0 and maintained at that value by the addition, as required of 6.5 N H$_2$SO$_4$ solution (see reference to 6.5 N H$_2$SO$_4$ above). Because the resulting mixture became extremely gelatinous, an additional 5 liters of H$_2$O were added with stirring and stirring was continued for an additional hour. The mixture was then filtered through a Buchner funnel using a canvas filtering cloth and vacuum and after about an hour the vacuum was turned off and the mixture in the funnel was allowed to settle overnight. In the morning, vacuum filtration was again initiated and continued until the resultant filter cake cracked substantially. The filter cake was then slurried in 2 liters of distilled water containing 6 drops of concentrated H$_2$SO$_4$ and again filtered through a Buchner funnel using a canvas filtering cloth and vacuum until the filter cake thus obtained was cracked. This procedure was repeated twice after which the filter cake was slurried in 2 liters of distilled water, filtered and then washed in the filter with 2 liters of distilled water. The filter cake was then sucked dry and one fourth of the cake was placed in a 4 liter beaker and slurried therein with 1 liter of distilled water—the slurry had a pH of about 9.2—and transferred to a 2 liter flask and heated to boiling for about 1.5 hours. The resultant slurry was then filtered hot and the filter cake was washed twice with 200 cc. of distilled water, reslurried in 1 liter of distilled water ( slurry had pH of 9.1), filtered through #1 filter paper and the resultant filter cake was reslurried in aqueous 1 N ammonium nitrate solution (slurry pH was 6.2). This slurry was filtered through #1 filter paper, and the resultant cake was washed three times with 200 cc quantities of distilled water. The cake was then placed in a covered evaporating dish overnight and then transferred to a crucible and heated in a muffle furnace at 300° C. for 0.5 hour and at 500° C. for 3.5 hours. The resultant silica alumina cogel had a silica content of about 75% and an alumina content of about 25% alumina, and an acid content of about 16 meq/m$^2 \times 10^4$.

This cogel was used as a catalyst for the preparation of HCN in the following manner. A mixture of substantially pure NH$_3$ and substantially pure CO in a mol ratio of 2:1 (NH$_3$ to CO) was passed over the above described cogel at a temperature of about 500° C. and a pressure of 500 psig (gauge) and a GHSV of about 5400 hr$^{-1}$ at STP. It was found that the CO was converted to HCN with a selectivity of about 100% and % conversion of about 2.8, and with no significant decomposition of NH$_3$. The % conversion of CO to HCN can be increased by increasing the temperature at which the CO and NH$_3$ are passed over the cogel. This catalyst was quite stable under the reaction conditions used.

The present invention also provides a process for recovering HCN, from a mixture of gases primarily composed of HCN, H$_2$O, NH$_3$ and CO. A flow diagram of equipment which can be used in practising the process is presented in FIG. 1. In carrying out this recovery process, the effluent gases from the catalyst in the reactor 10 at a temperature above 400° C. and which are composed primarily of HCN, H$_2$O, NH$_3$ and CO, are first cooled in a feed-product heat exchanger 11 to a temperature above 104° C. preferably about 110° C. Most of the heat released during this cooling step is employed to heat recycle reactants. (see items 12 and 13) which are fed to reactor 10. Further cooling is carried out in cooler 14 if necessary. If the temperature is allowed to drop to 104° C. or below, solids form due to gas phase reactions between the HCN and NH$_3$ and CO$_2$ and NH$_3$. The cooled gases are next fed to an absorption zone (absorber 15) in contact with liquid NH$_3$ which converts the HCN and any CO$_2$ in the gases to ammonium cyanide (hereafter NH$_4$CN) and ammonium carbamate, respectively. At least 2 moles of excess NH$_3$ per mole of NH$_4$CN are provided thereby insuring that the HCN (as NH$_4$CN) remains trapped with NH$_3$ and is not free to undergo some polymerization in the basic environment. In this absorption zone essentially all of the water in the cooled gases is also absorbed so that the gases exiting or leaving this zone are essentially free of HCN, $CO_2$ and $H_2O$. The foregoing absorption process can be operated under various temperature and pressure conditions, but are, preferably, in the range of about 50°–75° C., and a pressure of about 450–600 psig (gauge).

The gases exiting or leaving the aforementioned absorption zone consist primarily of CO, $NH_3$ and small amounts of nitrogen ($N_2$), hydrogen ($H_2$) and methane ($CH_4$), and in operating the HCN recovery process it is desirable that the $N_2$, $H_2$ and $CH_4$ be purged from the system. To accomplish this, a small purge, about 5% or less, of the volume of the gases exiting from the absorption zone are removed from the system, i.e. are vented off or otherwise disposed of as hereinafter described. At this purge rate the $H_2$, $N_2$ and $CH_4$ reach steady state levels, for example, of the order of 1.7%, 1.4% and 1.3%, respectively. The purge gases are first cooled in cooler 16 to remove substantially all of the $NH_3$ (i.e. more than 85% of the $NH_3$) contained therein and the remaining $NH_3$ is removed via conventional absorber 17 using water as the absorbant. The off gas from this absorber is essentially free of $NH_3$, while the bottoms or liquid in the absorber are sent to an ammonia drying column 18 to recover the $NH_3$ therein.

The gases exiting from the absorption zone 17 are composed primarily of CO (usually above 70%) and the remainder is $H_2$, $N_2$ and $CH_4$. The CO can be recovered from this stream using a variety of commercial systems and then recycled to the reactor.

The liquid, or bottoms, from the absorption zone are composed primarily of $NH_3$ (usually in excess of 40%) $H_2O$ (usually in amounts of 20–30%) and $NH_4CN$ (usually in amounts of 20–30%) together with small amounts, on the order of 0.5 to about 2%, of ammonium carbamate($NH_4CO_2NH_2$). These bottoms should contain sufficient $NH_3$ to keep the HCN tied up or bound as $NH_4CN$, otherwise the HCN would polymerize in this basic environment. These bottoms are subjected to a short contact time isothermal flash in Item 19 to reduce the total $NH_3$ to HCN mole ratio to 2:1 ($NH_3$ to $NH_4CN$ mole ratio of 1:1). The resultant liquid is next reacted in vessel 20 with a mixture of ammonium sulfite and ammonium bisulfite. Any acidic solution which has the ability to (1) recover and then release ammonia in an economic manner, and (2) cause the decomposition of ammonium cyanide and ammonia, carbon dioxide compounds can be used. For example, an ammonium phosphate-diammonium phosphate mixture may be used in lieu of the bisulfite-sulfite system. The bisulfite reacts with the free $NH_3$ and also with the $NH_3$ combined in the $NH_4CN$, thereby springing or releasing HCN. This part of the process is preferably carried out in vessel 20 provided with an agitator 21. The bisulfite to sulfite ratio fed to the bottoms in the vessel is such that after the bisulfite reacts with the free $NH_3$ and the $NH_3$ combined in $NH_4CN$, the pH of the resulting mixture is slightly acidic, desirably below 6.7 and preferably about 6–6.3. In carrying out this aspect of the process, the HCN leaving the reactor can be conveyed to a storage area, but preferably, is passed upward in an HCN scrubber 22 countercurrent to acidic ammonium sulfite-bisulfite stream being supplied to the reactor at a pH of about 5.3 to about 5.7. By operating in the foregoing manner, the HCN is released and maintained in an acidic environment and thus polymerization of the HCN is avoided. The HCN is preferably maintained in an acidic environment by the addition of $SO_2$ or other inhibiting agent. The wet HCN is dried using conventional distillation equipment 23, and then stored until used.

The ammonium bisulfite-sulfite mixture in the reactor (obtained after freeing HCN as above described) can be regenerated in a reboiled stripper 24 operating at about 100–110 psig. The overhead vapor from this stripper, which contains about 60–70% $NH_3$ and 40–30% by weight of water, is passed through a partial condenser in which about 90% of the water is condensed and removed. The $NH_3$ can be reused in the overall process in various ways, but preferably is used in the $NH_3$-$H_2O$ absorption zone described above. The ammonium bisulfite-sulfite mixture from the stripper can be used to free HCN as described previously herein.

It will be apparent that obvious variations in the processes and materials described herein may be made without departing from the spirit of the present invention.

What is claimed is:

1. A process for producing HCN which comprises bringing a mixture of gases containing CO and $NH_3$ at elevated temperatures and pressures into contact with a solid, water-insoluble catalyst having a protonic acid strength of at least 15 meq/$m^2 \times 10^4$.

2. A process as in claim 1, wherein the mixture containing CO and $NH_3$ is at a temperature of about 550° C. to about 750° C. and at a pressure of about 200 to about 600 psig.

3. A process as in claim 2, wherein the mixture containing $NH_3$ and CO provides a mol ratio of CO to $NH_3$ of about 1:4 to about 1:6.

4. The process of claim 1 in which the catalyst is an alumina silicate cogel or synthetic zeolite.

5. The process of claim 4 in which the alumina silicate has alumina content of about 30 to about 5 weight percent and about 70 to about 95 weight percent of silica.

6. A process for producing HCN which comprises bringing a mixture of gases containing CO and $NH_3$ in a mol ratio of about 1:4 to about 1:6 and at a temperature of about 550° C. to about 750° C. and at a pressure of about 500 to about 650 psig into contact with a solid, water-insoluble catalyst containing alumina and silica as essential components and having a protonic acid strength of at least 15 meq/$m^2 \times 10^4$.

7. A process, as in claim 6, wherein the catalyst is a solid water-insoluble, alumina-silica zeolite, having an alumina to silica content of about 25 to about 10 weight % alumina and about 75 to about 90 weight % of silica and a protonic acid strength of at least 16 meq/$m^2 \times 10^4$.

8. A process as in claim 7, wherein the CO and $NH_3$ are contacted with the catalyst using GHSV's of the order of about 5000 to about 9000 $hr^{-1}$ at STP.

9. A process as in claim 7, wherein the HCN produced in the process is separated from other substances and is recovered in substantially pure form.

10. A process for producing HCN and recovering HCN in substantially pure form which comprises bringing a mixture of gases containing CO and $NH_3$ at elevated temperatures and pressures into contact with a solid, water-insoluble catalyst having a protonic acid strength of at least 15 meq/$m^2 10^4$ to form a mixture of gases containing essentially HCN, $H_2O$, $CO_2$, CO, $NH_3$, $H_2$, $N_2$, and $CH_4$, absorbing HCN, $H_2O$, and $CO_2$ from said mixture in an absorption zone containing liquid $NH_3$ to form a liquid mixture composed essentially of $NH_3$, ammonium cyanide, $H_2O$ and small amounts of ammonium carbamate, purging a portion of the gas mixture leaving the absorption zone thereby obtaining a substantially steady state content of $H_2$, $N_2$ and $CH_4$, removing said liquid mixture from said adsorption zone and treating same with an acidic aqueous liquid, thereby causing HCN to be released as a gas, from the ammonium cyanide in said liquid mixture and recovering the HCN gas.

11. A process as in claim 10, wherein the mixture of gases contains CO and $NH_3$ in a mol ratio of about 1:4 to about 1:6 and is at a temperature of about 550° C. to about 750° C. and at a pressure of about 500 to about 650 psig and said mixture is brought into contact with a solid, water-insoluble catalyst containing alumina and silica as essential components and having a protonic acid strength of at least 15 meq/m$^2 \times 10^4$.

12. A process as in claim 10, wherein said acidic aqueous liquid contains ammonium bisulfite and ammonium sulfite.

13. A process as in claim 1 in which the catalyst contains alumina and silica as essential components and the conversion of CO to HCN is relatively low per pass of catalyst, and HCN formed is separated from unreacted $NH_3$ and CO gases which are recycled past the catalyst for further production of HCN.

14. The process of claim 13 in which conversion per pass is about 7 to 13% and CO and $NH_3$ are contacted with the catalyst using GHSV's of the order of about 5000 to about 9000 hr$^{-1}$ at STP, and the catalyst and conditions are highly selective for converting CO and $NH_3$ to HCN while substantially avoiding the conversion of CO to $CO_2$ via the water gas shift reaction.

* * * * *